United States Patent [19]

Vidovic et al.

[11] Patent Number: 4,915,054
[45] Date of Patent: Apr. 10, 1990

[54] WARNING DEVICE FOR A BICYCLE

[75] Inventors: Ninoslav Vidovic; Aleksandra Vidovic, both of 5032 Centre Ave. #201, Pittsburgh, Pa. 15213; Arnold J. Cook, 5508 Baywood St., Pittsburgh, Pa. 15206

[73] Assignees: Arnold J. Cook; Ninoslav Vidovic; Aleksandra Vidovic, all of Pittsburgh, Pa.

[21] Appl. No.: 277,997

[22] Filed: Nov. 30, 1988

[51] Int. Cl.$^4$ .......................... G10K 9/04; B60Q 5/00
[52] U.S. Cl. .......................... 116/142 FP; 116/137 R; 116/28 R; 116/DIG. 44; 74/551.9
[58] Field of Search .................. 116/3, 24, 59, 137 R, 116/142 FP, DIG. 44, 28 R; 124/55; 135/65, 66, 72, 76; 181/178, 179, 189, 190; 222/3, 5, 39; 280/816, 819, 821, 822; 381/156; 74/551.8, 551.9; 16/DIG. 12; 340/432; 362/72; 446/216; 273/81 R, 81 A, 81 B, 81 C, 81 D, 81.4, 81.5, 81.6

[56] References Cited

U.S. PATENT DOCUMENTS

| | | | |
|---|---|---|---|
| 2,094,217 | 9/1937 | Meredith | 74/551.9 |
| 2,416,160 | 2/1947 | Davidsson | 340/432 |
| 2,469,944 | 5/1949 | Bauters | 340/432 |
| 3,941,081 | 3/1976 | Nakamura | 116/142 FP |
| 4,185,670 | 1/1980 | Sartell, Jr. | 141/94 |
| 4,278,274 | 7/1981 | Ray | 280/821 |
| 4,623,954 | 11/1986 | Schott et al. | 362/72 |

FOREIGN PATENT DOCUMENTS

| | | | |
|---|---|---|---|
| 496609 | 4/1930 | Fed. Rep. of Germany | 362/72 |
| 2012872 | 10/1971 | Fed. Rep. of Germany | 280/816 |
| 2209707 | 4/1973 | Fed. Rep. of Germany | 280/816 |
| 869388 | 5/1961 | United Kingdom | 74/551.9 |

Primary Examiner—William A. Cuchlinski, Jr.
Assistant Examiner—W. Morris Worth
Attorney, Agent, or Firm—Alder, Cohen & Grigsby

[57] ABSTRACT

The present invention pertains to a warning apparatus with respect to a bicycle. The warning apparatus is comprised of a device for signaling that does not require the bicycle to be seen in order for a signal provided by the signaling device to be noticed. The signaling device is in juxtaposition with the bicycle. Additionally, the warning apparatus is comprised of a device for activating the signaling device. The activating device is in communication with the signaling device. In a preferred embodiment, the activating device includes a device for powering the signaling device and a device for actuating the powering device so the signaling device receives power to produce a signal. In a more preferred embodiment, the warning apparatus is comprised of a modular grip that is comprised of a first element having a first opening that receives the end of the bicycle, a platform at the top of the first element, a hand conforming area disposed essentially parallel to the first opening, and a second opening disposed essentially parallel to the first opening. The modular grip is also comprised of a second element having the device for signaling and the device for actuating the signaling means. The second element is removably attached to the platform. Additionally, the modular grip is comprised of a device for powering the signaling device. The powering device is controlled by the actuating device to power the signaling device. The powering device is disposed in the second opening of the first element.

6 Claims, 4 Drawing Sheets

WARNING DEVICE FOR A BICYCLE

FIELD OF THE INVENTION

The present invention pertains to a warning apparatus with respect to a bicycle. More specifically, the present invention pertains to a warning apparatus comprised of a modular grip from which a signal is provided that alerts people nearby that the bicycle is present.

BACKGROUND OF THE INVENTION

The recent increase in popularity during the last few years of bicycle racing has resulted in a much greater use of bicycles by the general public. Except for the small number of specially designed and built bicycle tracks, bicycling is practiced almost everywhere, with driving conditions ranging from those found on mountain roads to those found on the crowded streets of a megapolis like New York.

Basic problems bicyclists face nowadays comes from the heavy traffic. There are a number of situations which cause a considerable threat of accidental injury due to the collisions between bicyclists and other vehicles and with pedestrians as well.

One such situation is when pedestrians cross an intersection with a red light immediately after the last automobile of a series passes but do not observe an oncoming bicyclist. There are known cases of collisions between bicyclists and pedestrians which result in serious injuries both to the bicyclists and the pedestrians.

Another situation is where a bicyclist is driving in the dead angle of a moving car and the car driver is unaware of the bicyclist's presence. The driver subsequently turns into the path of the bicyclist, resulting in a collision and injuries.

In U.S. Pat. Nos. 2,469,944, 2,416,160 and 4,623,954, there is described a light source accommodated in the handle of the bicycle handlebar which emits visible warning signals using electric power. Use of the device is limited to the situations when a bicyclist wants to show the direction of a turn or under conditions of reduced visibility to provide a light signal for all traffic approaching from the rear and from the sides.

In U.S. Pat. No. 3,941,081, there is described an alarm device with a trumpet like cylindrical body producing audible sonic signal using an air blower bag. However, none of these enable a bicyclist to effectively prevent the above-described situations.

Accordingly, one object of this invention is to provide an easy, convenient means for warning other traffic participants of the presence of bicyclists.

Another object of the invention is to provide a device which is easily accommodated on the bicycle handlebar and used as a bicycle handle and warning device.

Still another object of the invention is to provide a device which emits an audible warning signal.

Yet another object of the invention is to provide a bicycle handle which contains a warning device which is easily and quickly installed or replaced as needed.

Other objects of the invention and a number of the advantages thereof will be apparent from the accompanying drawings and description of the invention.

SUMMARY OF THE INVENTION

The present invention pertains to a warning apparatus with respect to a bicycle. The warning apparatus is comprised of means for signaling that does not require the bicycle to be seen in order for a signal provided by the signaling means to be noticed. The signaling means is in juxtaposition with the bicycle. Additionally, the warning apparatus is comprised of means for activating the signaling means. The activating means is in communication with the signaling means.

In a preferred embodiment, the activating means includes means for powering the signaling means and means for actuating the powering means so the signaling means receives power to produce a signal.

In a more preferred embodiment, the warning apparatus is comprised of a modular grip that is comprised of a first element having a first opening that receives the end of a bicycle handle bar, a platform at a first side of the first element, a hand conforming area disposed essentially parallel to the first opening, and a second opening disposed essentially parallel to the first opening. The modular grip is also comprised of a second element having means for signaling and means for actuating the signaling means. The second element is removably attached to the platform. Additionally, the modular grip is comprised of means for powering the signaling means. The powering means is controlled by the actuating means to power the signaling means. The powering means is disposed in the second opening of the first element.

BRIEF DESCRIPTION OF THE DRAWINGS

In the accompanying drawings, the preferred embodiments of the invention and preferred methods of practicing the invention are illustrated in which.

DESCRIPTION OF THE PREFERRED EMBODIMENT

Figure 1:
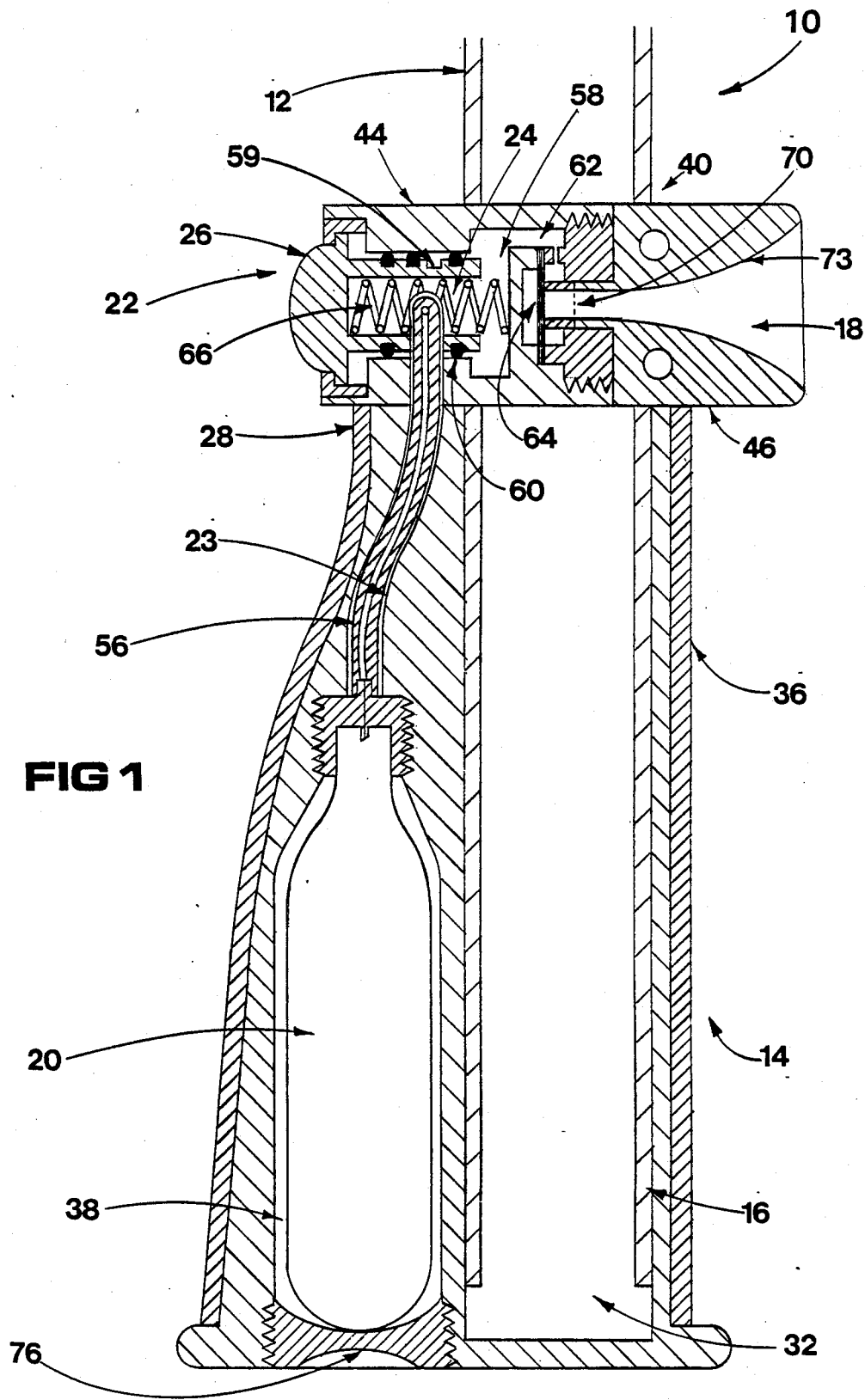
FIG. 1 is a schematic overhead cross-sectional view of the warning device.

Referring now to drawings where like-reference numerals refer to identical or corresponding parts throughout the several views and more specifically to FIG. 1 thereof, there is shown a bottom cross-sectional view of a warning apparatus 10 with respect to a bicycle handle bar 12. The warning apparatus 10 comprises means for signaling that does not require the bicycle 11 to be seen in order for a signal provided by the signaling means to be noticed. The signaling means is in juxtaposition with the bicycle 11. The warning apparatus 10 is also comprised of means for activating the signaling means. The activating means is in communication with the signaling means. Preferably, the activating means and the signaling means are in contact with the bicycle 11. In a preferred embodiment, the activating and the signaling means are part of a grip that is disposed on the bicycle handle bar 12.

Figure 3:
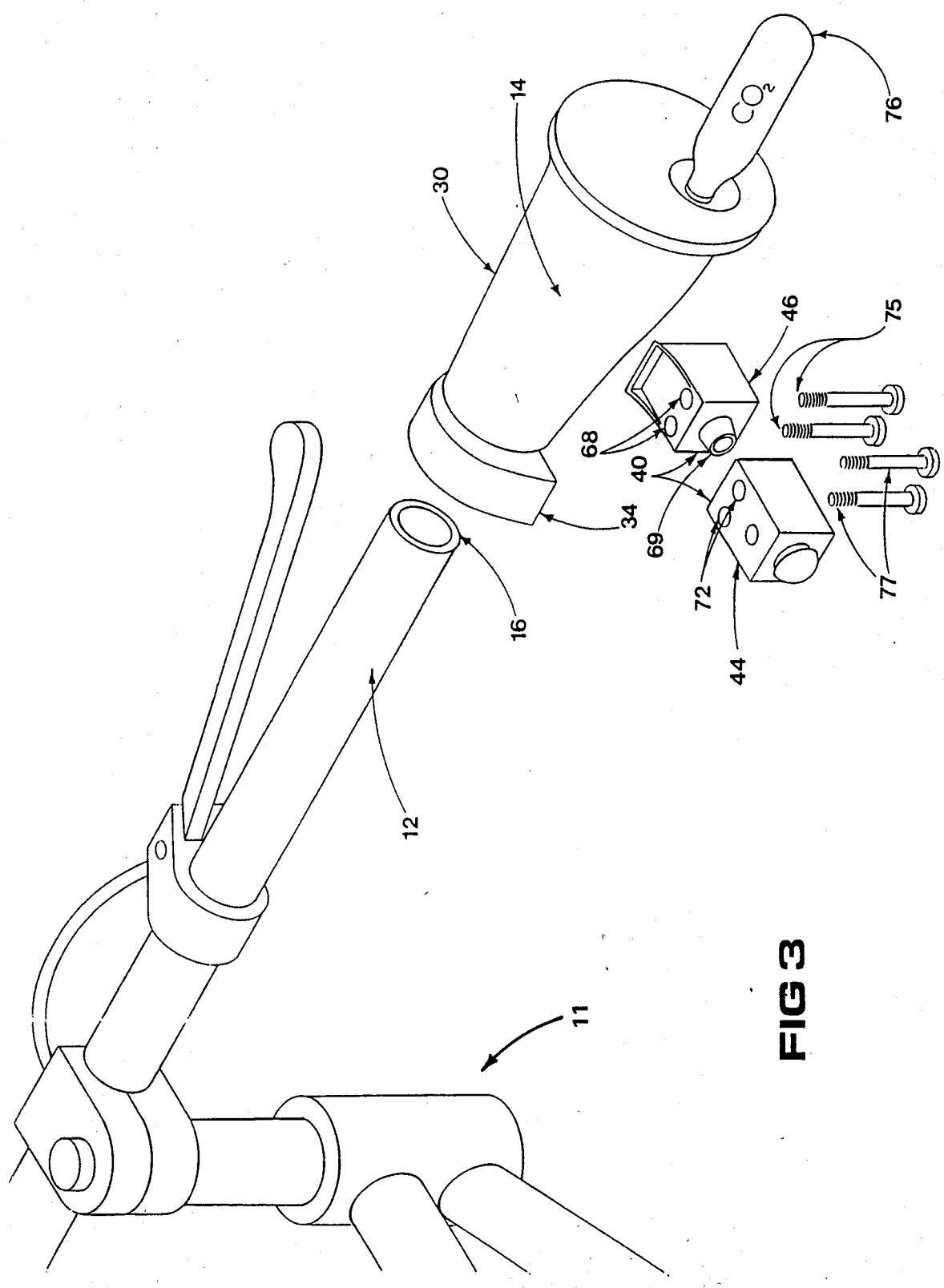
FIG. 3 is a exploded view of the warning device.

Preferably, the activating means includes means for powering the signaling means and means for actuating the powering means so the signaling means receives power to produce a signal. Additionally, the grip 14 is modular as shown in FIG. 3. The modular grip 14 is comprised of a first element 30 having a first opening 32 that receives end of the handlebar 16 of the bicycle 11, a platform 34 at a first side of the first element 30 and a hand conforming area 36 essentially parallel to the first opening 32. The hand conforming area 36 is preferably made out of foam that is positioned about the first element 30. Additionally, the first element 30 includes a second opening 38 disposed essentially parallel to the first opening 32.

Figure 4:
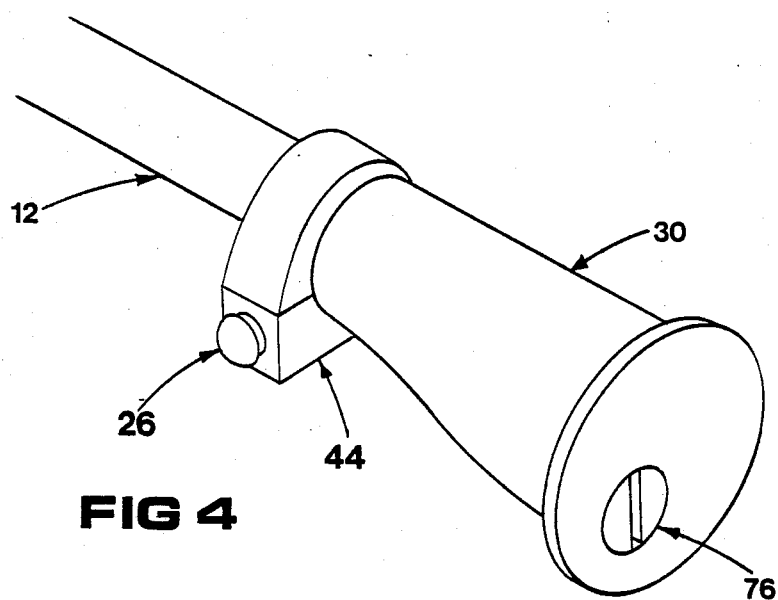
FIG. 4 is an angular view of the warning device.

The modular grip 14 also is comprised of a second element 40 that has the signaling means and the means for actuating the signaling means. The second element 40 is removably attached to the platform 34. The powering means is controlled by the actuating means to power the signaling means. Preferably, the second element 40 has a first part 44 and a second part 46 which are each removably attachable to the platform 34 and in contact when disposed thereon. The actuating means is disposed in the first part 44 of the second element 40. The modular grip is shown in FIG. 4 in its assembled form.

The signaling means is, for instance, a whistle, a siren, or preferably a horn 18 that produces an acoustic signal. The signaling means, however, can also be a light emitting device such as a strobe light or a transmitter or transmitter-receiving device (not shown).

The powering means is, for instance, a battery or preferably a pressurized gas cartridge 20. The gas cartridge 20 is fluidically connected to the horn 18. The activating means controls when gas from the cartridge 20 passes to the horn 18 to power the horn 18. The powering means is disposed in the second opening 38.

The actuating means can be an electrical circuit that, for instance, allows current to be provided, to an electrically powered device such as a light emitting device (not shown) or preferably a valve 22 when a gas cartridge 20 is used to power a horn 18. The valve 22 preferably has a first portion 24 controlling when gas from the cartridge 20 passes to the horn 18. The valve 22 also has a second portion 26 which is connected to the first portion 24 and which extends from the surface 28 of the grip 14 such that when the second portion 26 is pushed toward the grip 14, the first portion 24 allows gas to pass therethrough.

Figure 2:
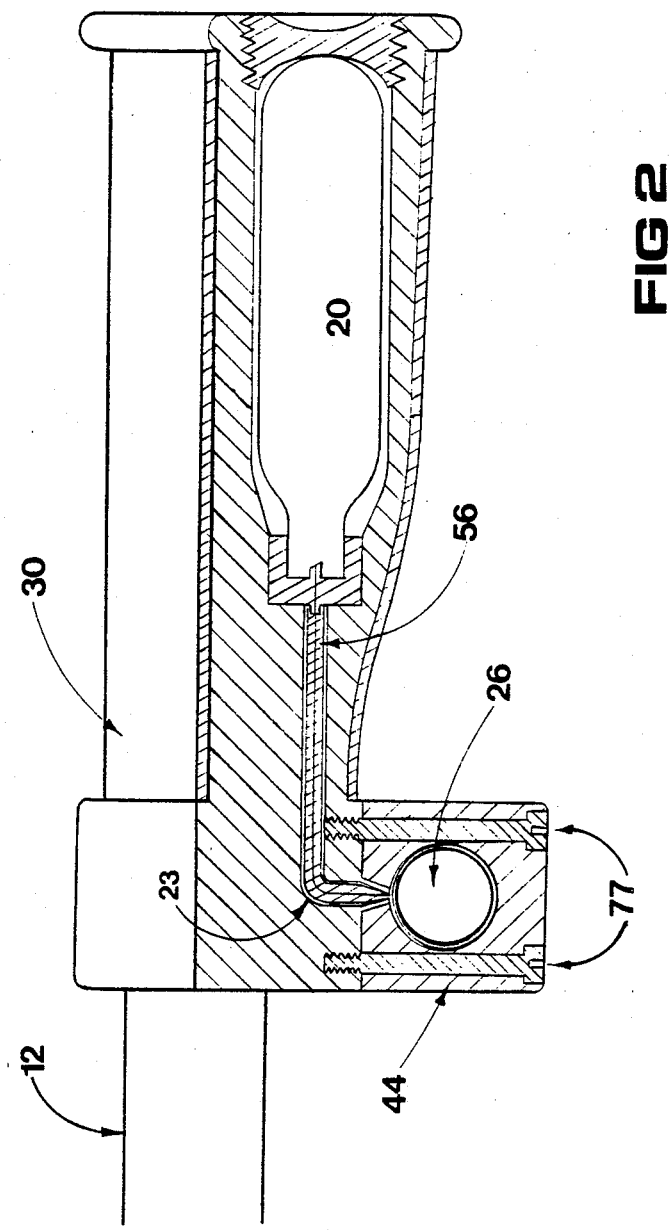
FIG. 2 is a schematic side cross-sectional view of the warning device.

In the operation of the preferred embodiment, and referring to FIGS. 2 and 3, a cartridge 20 is inserted into the second opening 38. As the cartridge 20 is seated into the second opening 38, a hollow rod 56 penetrates into the cartridge 20 allowing the pressurized gas to escape into the rod 56. The pressurized gas in the hollow rod 56 is contained by the first portion 24 of the valve 22 in a first channel 59 that is formed in the first portion 24 of the valve 22. The hollow rod 56 extends from the cartridge 20 to the valve 22. Preferably, the hollow rod 56 has a loop 23 that allows the hollow rod to reach valve 22 from the cartridge 20. This loop is required because the first part 44 with the second portion 26 is under the handle bar 12 so the thumb of the user can easily reach it when necessary.

When the second portion 26 of the valve 22 is depressed by a user, the first portion 24 of the valve 22 is forced to move toward a second channel 58. When this occurs, O-rings 60, which aid in the retention of the pressurized gas in the first channel 59, move into the second channel 58. When the O-rings 60 enter into the second channel 58, the pressurized gas is able to escape into the second channel 58.

From the second channel 58, the pressurized gas passes through third channel 62 to diaphragm 64 which is caused to vibrate by the pressurized gas. The vibration of the diaphragm 64 causes an acoustic signal to be produced that can be heard by people in the vicinity of the user. The signal produced by the diaphragm 64 passes out of the grip 14 via a resonance chamber 73 of the horn 18.

When the user releases the second portion 26 of the valve 22, a spring 66 causes the first portion 24 and second portion 26 of the valve to return to the original position. Pressurized gas is then again contained by the first portion 24 of the valve 22. In this way, the pressurized gas in the cartridge 20 is conserved and the user can produce many signals with the warning device 10 before the gas in the cartridge 20 is exhausted.

If, for instance, a user desires to change the pitch of the signal produced by the horn 18 then the second part 46 of the second element 40 can be removed and a different second part 46 with a differently shaped resonance chamber 73 can be attached to the platform 34. This can be accomplished, for instance, by inserting screws 75 on the bottom of the second element 46 into the second part plug holes 68 in the platform 34 and also aligning the opening 69 of the horn 18 of the second part 46, as shown in FIG. 3, with the opening 70 of the horn 18 of the first part 44, as shown in FIG. 1. Alternatively, the horn 18 of the second part 46 can have a male portion (not shown) that fits into a female portion (not shown) of first part 44 to maximize the passage of the signal produced by the diaphragm 64 of the horn 18.

Similarly, first part 44 of second element 40 can be replaced in a similar fashion as described with the replacement of the second part 46. In this instance, screws 77 are fitted into first part plug holes 72 to replaceably attach the first part 44 with the platform 34.

The cartridge 20 can be replaced by first removing a cartridge plug 76 and then pulling the cartridge 20 away from the first element 30. A new cartridge 20 can then be releasably attached to the first element 30 by snapping the new cartridge into the second opening 38 of the first element 30. As this is done, hollow rod 56 is threaded into the new cartridge 20.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. A warning device with respect to a bicycle comprising:

a modular grip comprising a first element having a first opening that receives a bicycle handle bar, a platform at a first end of the first element, a hand conforming area disposed essentially parallel to the first opening, and a second opening disposed essentially parallel to the first opening;

a second element having means for signaling and means for actuating the signaling means, said second element removably attached to the platform; and means for powering the signaling means, said powering means being controlled by the actuating means to power the signaling means, said powering means disposed in the second opening of the first element.

2. An apparatus as described in claim 1 wherein the second element has a first part and a second part which are each removably attachable to the platform and in contact when disposed thereon, said actuating means disposed in said first part.

3. An apparatus as described in claim 2 wherein the signaling means produces an acoustic signal.

4. An apparatus as described in claim 3 wherein the signaling means is a horn.

5. An apparatus as described in claim 4 wherein the powering means includes a gas cartridge having a pressurized qas which is fluidically connected to the horn, said actuating means controlling when gas from the cartridge passes to the horn to power the horn.

6. An apparatus as described in claim 5 wherein the actuating means includes a valve having a first portion controlling when gas from the cartridge passes to the horn, and a second portion which is connected to the first portion and which extends from the grip such that when the second portion is pushed toward the grip, the first portion allows gas to pass therethrough.

* * * * *